United States Patent [19]

Murphy et al.

[11] 3,714,792

[45] Feb. 6, 1973

[54] FREEZING AND MELTING TREATMENT OF RED MUD SLURRIES TO AID SOLID SEPARATION

[75] Inventors: James M. Murphy, Oakland; Perce W. Bolmer, Danville, both of Calif.

[73] Assignee: Kaiser Aluminum & Chemical Corporation, Oakland, Calif.

[22] Filed: Aug. 19, 1971

[21] Appl. No.: 173,226

[52] U.S. Cl. .......................... 62/58, 23/312 P, 209/5, 423/119, 423/122, 252/349
[51] Int. Cl. ........................... B01j 13/00, B01d 9/02
[58] Field of Search ......... 62/58; 23/305, 313, 312 P; 252/319, 346, 347, 349; 423/119, 121, 122; 209/5, 11

[56] References Cited

UNITED STATES PATENTS

| 938,432 | 10/1909 | Peffer | 423/121 |
|---|---|---|---|
| 2,922,761 | 1/1960 | Davenport | 252/349 |
| 3,148,024 | 9/1964 | Hayes et al. | 23/305 |
| 3,311,449 | 3/1967 | Atsukawa et al. | 423/122 |
| 3,397,953 | 8/1968 | Galvin et al. | 423/119 |
| 3,508,884 | 4/1970 | Ostap et al. | 62/58 |
| 3,681,931 | 8/1972 | Hadzeriga | 23/312 P |

*Primary Examiner*—Norman Yudkoff
*Assistant Examiner*—R. T. Foster
*Attorney*—Paul E. Calrow

[57] ABSTRACT

Red mud slurries, resulting from the alkaline digestion of bauxite and consisting of finely divided red mud particles dispersed in an aqueous medium, are subjected to a freeze-thaw treatment to enhance the settling properties and the filterability of the dispersed particles. Lowering the temperature of the slurry to a temperature required to freeze at least a portion of the aqueous medium, followed by thawing, was found to impart significantly accelerated settling and filtration rates.

10 Claims, No Drawings

FREEZING AND MELTING TREATMENT OF RED MUD SLURRIES TO AID SOLID SEPARATION

BACKGROUND OF THE INVENTION

This invention relates to a process for improving the settling rates and the filterability of red mud slurries. More particularly, it concerns a process, wherein red mud slurries containing red mud particles in the size range of 10 microns or less are subjected to a freeze-thaw treatment to obtain greatly increased rates of settling and filtration.

Aluminiferous ores, such as bauxite, are generally subjected to alkali digestion, such as the well-known Bayer process, in order to recover the alumina values. The alkali digestion results in an alkali-soluble fraction containing most of the alumina values and an alkali-insoluble residue, containing among other constituents finely divided iron oxide particles. The color imparted to the insoluble residue by these iron oxide particles is usually reddish-brown, which accounts for the expression of "red mud" generally applied to the insoluble residue of the Bayer process digestion.

The physical properties of the insoluble digestion residue, including the settling property and the filterability, greatly vary, depending on the source of the aluminiferous ores. Thus, it has been found that alkali digestion of aluminiferous ores which contain a portion of their iron constituent in the form of goethite [FeO(OH)] results in an alkali-insoluble residue, the average particle size of which is less than 10 microns and frequently 1 micron or less. This alkali-insoluble residue present in the form of an aqueous slurry, due to the very small size particles suspended in the slurry, is hard to settle within a reasonable time period, and filtration of this slurry is a time-consuming process. The slow settling rate of the suspended particles affects the overall economy of the Bayer process, since it is desirable to recover entrained alkali, which is generally recycled to the digestion process. Separation and disposal of the red mud, for example, by filtration, in many instances proved to be ineffective, particularly when the average particle size of the particles dispersed in the slurry is in the aforementioned size range. This results in added expense and serious disposal problems for Bayer process plants.

Due to the wide use of the Bayer process for the digestion of aluminiferous ores and the frequency with which the alumina industry encounters ores containing a portion of their iron content in the goethite phase, the large volumes of red mud slurries cause severe operational difficulties. Many suggestions were already advanced to improve the settling rate and the filterability of red mud slurries. These include, among others, the addition of compounds, such as starch or other macromolecular organic materials. Although the incorporation of these conditioning compounds in hard-to-settle red mud suspensions in many instances improves the settling rate, frequently it has been found that the filtration rate of the conditioned slurry is still unsatisfactory and the resulting red mud cake can contain undesirably high water content, often in the range of 60–70 percent by weight. The utilization of red mud, for example, for metallurgical purposes requires substantially lower water contents.

It has now been discovered that not only the settling rate, but also the filterability of red mud slurries can be substantially increased and improved by subjecting red mud slurries to the freeze-thaw process of the present invention. The novel process is particularly applicable to red mud slurries in which the average particle size of the suspended solids is 10 microns or less, and surprisingly good results can be achieved with goethite containing red mud slurries in which the average particle size of the suspended solids is 1 micron or less.

BRIEF SUMMARY OF THE INVENTION

A process is provided for improving the settling rate and the filterability of aqueous red mud slurries resulting from the alkali digestion of aluminiferous ores. The red mud slurry, containing particles in the size range of 10 microns or less which are suspended in an aqueous medium, is subjected to the process steps comprising lowering the temperature of the slurry below the temperature required to freeze at least a portion of the aqueous medium and then maintaining the slurry at this temperature for a time sufficient to convert at least a portion of the aqueous medium to solid. The temperature of the slurry is then raised above the melting point of ice, followed by separation of the red mud particles from aqueous media by gravity separation.

DETAILED DESCRIPTION OF THE INVENTION

In accordance with the present invention, aqueous red mud slurries are subjected to a freeze-thaw treatment to increase the settling rate of the dispersed particles and to improve the filterability of the slurry.

Red mud slurries, such as obtained as the digestion byproduct of the Bayer process, contain a considerable quantity of water, generally between about 60–90 percent by weight of the slurry. The solids content of the red mud slurry varies depending on the source of bauxite and also in a lesser degree on the conditions of the digestion process. In general, however, the major components of the solids consist of $Fe_2O_3$, $Al_2O_3$, $SiO_2$ and $TiO_2$. Minor quantities of other metallic salts, for example, salts of Ga, V, Mn and Cr, are also present in the red mud. A red mud of average composition is shown in the Table below.

TABLE I

Average Composition of Red Mud (dry weight)

| Component | % by weight |
|---|---|
| $Fe_2O_3$ | 40 – 60 |
| $Al_2O_3$ | 10 – 23 |
| $TiO_2$ | 0.5 – 8 |
| $SiO_2$ | 3 – 12 |
| $Na_2O$ | 3 – 10 |
| Ga, V, Mn, Cr, Ca, P | less than 10 |

The particle size distribution of the solids dispersed in the aqueous media also varies depending on the source of the bauxite subjected to the alkali digestion of the Bayer process. For example, red mud derived from the digestion of Jamaican bauxite consists mainly of particles having an average diameter of about 10 microns, or less, and a substantial fraction of the red mud particles fall within the size range of 0.1–0.05 micron range. These fine particles provide an aqueous slurry of colloidal or almost colloidal properties, e.g., an aqueous suspension of finely divided particles is produced by the digestion, which particles when the slurry is filtered plug the openings of the filter and create the usual filtration problems associated with colloid and quasi-colloid systems. Similarly, when this red mud slurry of finely divided particles is left to settle in order to decant and recover the liquor in which the solids are suspended, long time periods are required as well as a substantial settling capacity due to the large volumes involved.

Filtration under vacuum of red mud slurries, where the major size fraction of the particles fell within the 0.05–1 micron range, result in filter cakes containing 30–40 percent solids. This low solids content requires an additional drying treatment to increase the solids content to a more economical 45–50 percent. For economical and process reasons, i.e., pelletizing of red mud for metallurgical purposes, red mud filter cakes containing in excess of about 50 percent solids content are desired. Up until now, this was achieved by extensive drying requiring considerable heat and also expensive equipment. It has now been found that the red mud slurry resulting from the alkaline digestion of bauxites and containing about 10–20 percent solids can be filtered without drying to a solids content in excess of about 50 percent by weight, and thus the produced filter cake can be directly employed, for example, by briquetting for metallurgical purposes. This can be accomplished in accordance with the present invention by lowering the temperature of the red mud slurry prior to filtration or other gravity separation, such as settling, below the freezing point of water. After lowering the temperature below the freezing point of water for a time period sufficient to allow formation of ice crystals, the frozen sludge or slurry is allowed to warm up to room temperature and the ice crystals formed to thaw. This freeze-thaw treatment of the slurry will result in unexpected properties, such as increased settling rates for the solids, and also increased filterability.

The freezing treatment of the red mud slurry is accomplished by reducing the temperature of the slurry below 0° C, or less. Even relatively short holding times, such as 2–5 minutes, at these low temperatures suffice to improve the filterability and the settling rate of the slurry. For best results, it is advisable to reduce the temperature of the slurry to −5° C, or below, and to maintain the slurry at these temperatures for at least 5–10 minutes. Particularly good results in terms of settling and filterability were obtained with slurries kept within temperatures of about −10° C and −15° C for a time period of 3–15 minutes. Longer holding times, for example 15–60 minutes, at the temperatures indicated, further improve the properties of the slurry. The lowest temperature employed depends on the equipment available, but generally it has been found that it is not necessary to reduce the slurry temperature below about −26° C to obtain the same results imparted by a freezing treatment at about −12° C for 30–60 minutes. The freezing treatment imparts a slush or nearly solid consistency to the slurry, depending on the temperatures used. Subsequent to the freezing treatment, the slurry is allowed to warm to a temperature above the freezing point of water. The slurry can be heated to attain the temperature at which thawing occurs by artificial energy input, for example, by indirect or direct heating, by means of such devices as coils, etc., supplied with circulating warm water or steam. Alternatively, however, the red mud slush or frozen slurry can be allowed to stand until its temperature equals that of the surrounding atmosphere, provided the atmospheric temperature is above 0° C. Regardless of the manner in which the thawing is accomplished, the slurry after the freeze-thaw treatment possesses improved settling properties and can be filtered at significantly increased rates.

Once the freeze-thaw treatment is complete, the treated red mud slurry can be subjected to separation by gravity. Such separation methods include the simple settling of the treated red mud wherein a significant portion of the solids settles to the bottom of the settling vessel or tank, allowing the decantation of substantially solids-free supernatant. The solids residue of this type of gravitational separation can be then filtered on conventional filter apparatuses, such as Kelly presses, centrifuges equipped with sufficiently small openings, to recover a filter cake of high solids content, e.g., in excess of 50 percent by weight. The slurry subjected to the freeze-thaw treatment can also be filtered directly on conventional filter devices to obtain filter cakes of equally high solids contents, generally in excess of 50 percent by weight. In many instances, solids content up to 60–70 percent by weight can be obtained just by direct filtration without decantation.

The following examples and tables are provided only to further illustrate the process of the present invention without limitation as to the scope of the appended claims.

EXAMPLE I

Jamaican bauxite of the composition shown in Table II below was subjected to alkali digestion in accordance with the Bayer process. The digestion produced a red mud slurry residue, the composition of which is shown in Table III below. A 15 ml sample of the red mud slurry was placed into a plastic vial and the vial was immersed in a glycol-water bath maintained at −13° C. The vial was kept in this bath for 10 minutes after the temperature of the red mud slurry was lowered to −13° C. Subsequently, the vial was removed from the bath and immersed in hot water (80° C) for about 3–4 minutes to thaw the formed ice, followed by filtration on a Buchner funnel under vacuum (100 mm Hg absolute pressure). The formed filter cake was weighed. To compare the effect of the novel freeze-thaw treatment with conventional practice involving filtration alone, a 15 ml sample of the red mud slurry was filtered under the same conditions as the sample subjected to a freeze-thaw treatment. The results of the comparison test are reported in Table IV below.

TABLE II

Composition of Jamaican Bauxite [1]

| Major Constituents | % by weight |
|---|---|
| $Al_2O_3$ | 48.05 |
| $Fe_2O_3$ | 19.68 |
| $SiO_2$ | 1.60 |
| $TiO_2$ | 2.63 |
| $P_2O_5$ | 0.68 |
| Loss on Ignition (LOI) [2] | 26.44 |

[1] Dried at 105°C for 2 hours
[2] LOI determined by keeping bauxite at 1000°C for 30 minutes

TABLE III

Composition of Solids Content of Red Mud

| Major Constituents | % by weight (dry weight)* |
|---|---|
| $Fe_2O_3$ | 52.0 |
| $Al_2O_3$ | 16.0 |
| $SiO_2$ | 3.0 |
| $CaO$ | 8.0 |
| $TiO_2$ | 6.0 |
| $Na_2O$ | 2.0 |
| $P_2O_5$ | 1.5 |
| $MnO_2$ | 2.0 |
| LOI | 8.0 |
| Solids content | 14.7 |
| Approx. Surface area | 40–80 m²/g |
| pH | 12.8 |

* Dried at 105°C for 2 hours

TABLE IV

Comparison Data for Freeze-Thaw Treated Red Mud Slurry and Untreated Red Mud Slurry

| Sample | Filter Cake % by weight solids | Filtration Rate* sec/ml |
|---|---|---|
| 1. Freeze-thaw treated red mud | 57 | 5 |
| 2. Untreated red mud | 38 | 475 |

*Filtration Rate. Filtration rates were determined by using a filter area of 1.77 cm² and vacuum (250 mm Hg pressure). A known weight of solids was placed on the filter with a solution of 8 g/l $Na_2CO_3$, vacuum was then applied and an equal volume of clear $Na_2CO_3$ solution was added without mixing with the suspended solids. The time required to pass 1 ml of the clear $Na_2CO_3$ solution through the formed filter cake was then measured and reported.

EXAMPLE II

In this Example, red mud derived from the digestion of a Jamaican bauxite of high goethite content (21.9 percent of the total iron oxide content of the bauxite was present in the goethite form) was tested. A 15 ml sample of the red mud in a plastic vial was immersed in a glycol-water bath kept at −13° C. The sample was kept in the bath for 30 minutes after the temperature within the vial was the same as that of the bath. The sample was then removed and immersed in hot water until the temperature of the slurry within the vial was raised to about 20° C. The sample was filtered on a Buchner funnel, and its solids content and filtration rate was compared to an untreated red mud sample of the same composition. The results of the test are shown in Table V.

TABLE V

Comparison Data for Freeze-Thaw Treated Red Mud* Slurry Samples and Untreated Red Mud Slurry

| Sample | Filter Cake % by weight solids | Filtration Rate sec/ml |
|---|---|---|
| 1. Red mud slurry subjected to one freeze-thaw cycle | 50 | 8 |
| 2. Untreated red mud slurry | 30 | 572 |

* goethitic bauxite starting material

EXAMPLE III

Tests were repeated with red mud slurries by varying the freeze treatment temperature between 0° C and −37° C. As a result of these tests, it has been found that while freezing temperatures between 0° C and −6° C increase the solids content of the filter cake by about 20–30 percent in comparison to untreated red mud slurries, freezing temperatures between −6° C and −26° C caused the solids content of filter cakes to increase by as much as 40–50 percent in comparison to untreated samples. Treatments at temperatures below −26° C did not increase the solids content of the filter cakes by a significant degree in comparison to slurries treated between −6° and −26° C.

The freezing time was also varied between the limits of 3–160 minutes, and it was found that up to about 40 minutes of freezing treatment the solids content of filter cakes from red mud slurries increased, but freezing times in excess of about 40 minutes, while not harmful, did not significantly increase the solids content.

The thawing treatment was also repeated by allowing the frozen sample to reach ambient temperature (about 20° C) by absorbing heat from the atmosphere. No change in filter cake solids content was observed by varying the thawing treatment.

It has been observed that particularly good settling and filtration rates can be achieved by controlling the rate of cooling of the slurry. Thus, it has been found that cooling of a red mud slurry in a vial of about 22 mm. diameter at a rate of about 1°–4° C per minute from 0° C to below −10° C resulted in the filtration rates shown in the Tables above. Cooling rates in excess of about 10° C per minute for red mud slurries placed into a vial of the same diameter, while they improved the properties of the red mud, did not attain the same beneficial results.

What is claimed is:

1. A process for treating red mud slurries derived as digestion residue from the alkaline Bayer process treatment of bauxite and consisting of finely divided insoluble solids suspended in an aqueous medium in order to improve the settling and the filtration rate of the solids, which comprises:
    a. lowering the temperature of the slurry to at least the temperature required to freeze the aqueous medium;
    b. maintaining the slurry at this lowered temperature for a time sufficient to solidify by freezing at least a portion of the aqueous medium;
    c. raising the temperature of the slurry to a temperature sufficient to melt the solidified portion of the aqueous medium; and
    d. recovering the solids by gravitational separation.

2. Process according to claim 1, wherein the finely divided solids possess an average particle size of 10 microns or less.

3. Process according to claim 2, wherein the finely divided solids possess an average particle size of 1 micron or less.

4. Process according to claim 1, wherein the slurry temperature is lowered to below about −10°C.

5. Process according to claim 1, wherein the slurry temperature is lowered from about 0° C to about −10° C at a rate of about 1° to 4° C per minute.

6. Process according to claim 1, wherein the solids content of the slurry is about 10 to 40 percent by weight.

7. Process according to claim 1, wherein a portion of the iron minerals of the bauxite subjected to the Bayer process is present as goethite [FeO(OH)].

8. Process according to claim 1, wherein the bauxite is of Jamaican origin.

9. Process according to claim 1, wherein the gravitational separation is accomplished by settling.

10. Process according to claim 1, wherein the gravitational separation is accomplished by filtration.

* * * * *